United States Patent [19]

Magnussen, Jr.

[11] 3,805,046

[45] Apr. 16, 1974

[54] LOGARITHMIC CONVERSION SYSTEM

[75] Inventor: Haakon T. Magnussen, Jr., Pinole, Calif.

[73] Assignee: Spectra-Physics, Inc., Mountain View, Calif.

[22] Filed: Dec. 11, 1972

[21] Appl. No.: 314,128

[52] U.S. Cl. .................. 235/197, 235/196, 328/145
[51] Int. Cl. .................. G06g 7/26
[58] Field of Search .......... 235/197, 193, 196, 195; 328/145, 160, 161; 324/132

[56] References Cited

UNITED STATES PATENTS

| | | | |
|---|---|---|---|
| 3,648,043 | 3/1972 | Caron | 235/197 |
| 3,691,473 | 9/1972 | Boatwright | 235/196 X |
| 3,634,671 | 1/1972 | Swarbrick et al. | 328/145 X |
| 3,676,661 | 7/1972 | Sprowl | 235/195 X |

*Primary Examiner*—Joseph F. Ruggiero
*Attorney, Agent, or Firm*—Lindenberg, Freilich & Wasserman

[57] ABSTRACT

A new logarithmic conversion system takes advantage of the time domain as an intermediate step in converting an analog input signal into an output signal which is a function of the logarithm of the input signal. A reference signal which varies exponentially as a function of time during each of a succession of time intervals is compared with the input signal. The instant when the two signals are equal divides each period into two portions. During one portion the exponential signal is greater than the input signal and during the other portion the input signal is greater than the exponential signal. The two portions of the time period control the supply of an input to an integrating amplifier, whose output may be made to be a function of either the log of the input signal or the log of one over the input signal. The exponential signals are also used to control the amplifier to provide an output which is a function of the log of the ratio of two input signals.

15 Claims, 10 Drawing Figures

PATENTED APR 16 1974 3,805,046

SHEET 3 OF 3

LOGARITHMIC CONVERSION SYSTEM

BACKGROUND OF THE INVENTION

1. Field of the Invention

The present invention is generally directed to logarithmic conversion systems, and more particularly, to circuits which provide a logarithmic representation of an analog signal or the logarithmic representation of the ratio of two analog signals, and to a new method of logarithmic conversion.

2. Description of the Prior Art

There are two methods which are most commonly used for the logarithmic conversion of a D.C. and low frequency signals in analytical instruments. The most common method used takes advantage of the characteristics of a solid state PN junction. As is known, the voltage across a PN junction is a well defined function of the logarithm or log of the current through the junction. One major serious shortcoming of circuits employing this method is that they are characterized by a high noise level. In applications where lower noise levels are required, the most popular method of log conversion used involves a feedback system of some sort, in which the state of one of the linear gain-determining elements performs the actual log conversion. Circuits or systems utilizing the latter-mentioned method provide relatively low noise levels. However, due to their complexity, they are expensive to build and maintain. Therefore, a need exists for circuits which are capable of providing a logarithmic representation of an analog signal with low noise level, but which are less expensive and complex than prior art devices.

OBJECTS AND SUMMARY OF THE INVENTION

It is a primary object of the present invention to provide a new novel method of log conversion.

Another object of the present invention is to provide relatively simple and inexpensive circuits for providing a log representation of an analog input signal.

Another object of the present invention is to provide relatively simple and inexpensive circuits for providing an output which is the log representation of the ratio of two analog input signals.

These and other objects of the present invention are achieved by providing circuits which are based on a new novel method of log conversion, which takes advantage of the time domain as an intermediate step in the conversion of an analog input signal into an analog or digital output, which represents the log of the input signal. The same novel method is used in circuits designed to provide either an analog or digital output signal which represents the log of the ratio of two analog input signals. The analog input signals or the analog output signals may be either voltages or currents. To simplify the following description, all analog signals will be described as voltages. Similarly, all reference analog signals which are used in the circuits will be referred to as voltages.

Briefly, in accordance with the present invention, a voltage which varies as an exponential function of time is used as a reference to convert input voltages to time intervals which represent the log of the input voltages. In each embodiment, the voltage which varies as an exponential function of time, hereafter referred simply as the exponential voltage is compared in a comparator with each input voltage. Based on the amplitude comparison, in an embodiment designed to provide an analog output which is a log function of one input voltage, the comparator controls the input to an integrating amplifier whose output voltage is a function of the log of the input voltage, in addition to being a function of known circuit constants.

In an embodiment in which it is desired to provide an analog output which is the log of the ratio of two input voltages, each of the input voltages is compared with the exponential voltage. As a result of the comparisons, the input to the amplifier is controlled so that its output is essentially a function of the log of the ratio of the two input voltages. In embodiments designed to provide digital outputs, the output of the comparators are used to control the counting of pulses in counters, with the accumulated counts being operated upon to provide a digital output which represents the log of the ratio of the two input voltages as will be described hereafter.

The novel features of the invention are set forth with particularity in the appended claims. The invention will best be understood from the following description when read in conjunction with the accompanying drawings.

DETAILED DESCRIPTION OF THE PREFERRED EMBODIMENTS

Figure 1:
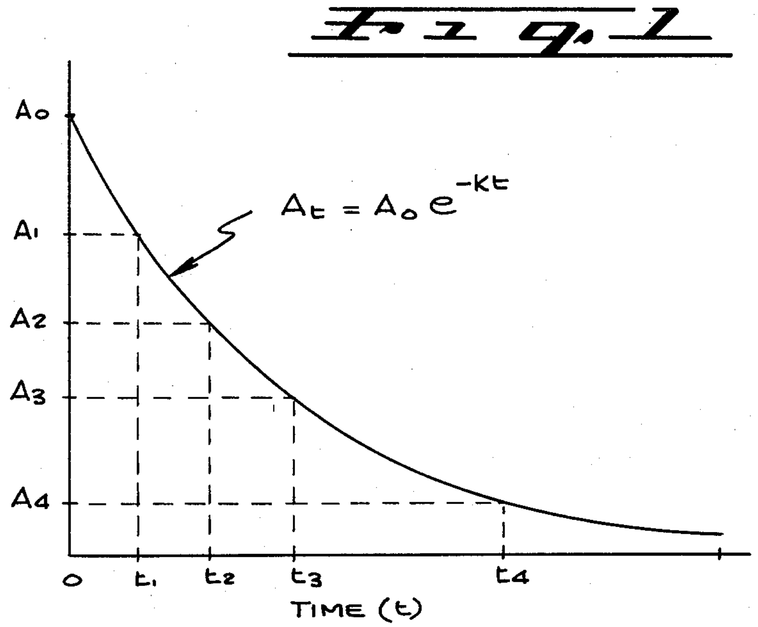
FIG. 1 is a diagram of a voltage amplitude which decays exponentially as a function of time.

The novel method of log conversion in accordance with the present invention may best be explained in connection with FIG. 1. It represents the relationship between an exponentially decaying reference voltage and time. Therein the ordinate represents voltage amplitude and the abscissa represents time ($t$). As is appreciated, the amplitude of the exponential voltage can be expressed as $$A_{(t)} = A_o e^{-kt} \quad (1)$$

It is clear kt at $t = 0$, the voltage amplitude is $A_o$ and as t approaches infinity, the voltage amplitude approaches zero. At any time the voltage amplitude can be expressed as $$A_n = A_o e^{-kt} \quad (2)$$

Solving for $t_n$ by taking the natural log of both sides of equation 2 and rearranging terms, $$t_n = (1/k) \ln (A_o/A_n) \quad (3)$$

If $A_o$ is made to represent unity then, $$t_n = -(1/k) \ln A_n \quad (4)$$

The resulting time interval between two voltage amplitudes of the exponential voltage can be shown to be directly proportional to the log of the ratio of the two voltage amplitudes.

For example at $t_2$, $A_2 = A_o e^{-kt}$ and at $t_3$, $A_3 = A_o e^{-kt}$ $^{3}$. Thus, $$t_2 = (1/k) \ln (A_o/A_2) \text{ and} \quad (5)$$

$$t_3 = (1/k) \ln (A_o/A_3) \quad (6)$$

Therefore, $$t_3 - t_2 = (1/k) [\ln (A_o/A_3) - \ln (A_o/A_2)] \quad (7)$$

$$t_3 - t_2 = (1/k) \ln (A_2/A_3) \quad (8)$$

The relationship between the resulting time interval and the log of the ratio of the two voltage amplitude is used as the basis of the various embodiments of the present invention. Briefly, in the present invention, amplitudes of input voltages are compared with the amplitude of the exponential voltage to determine the resulting time interval from which the log of the ratio of the input voltages is obtained.

Figures 2, 2A:
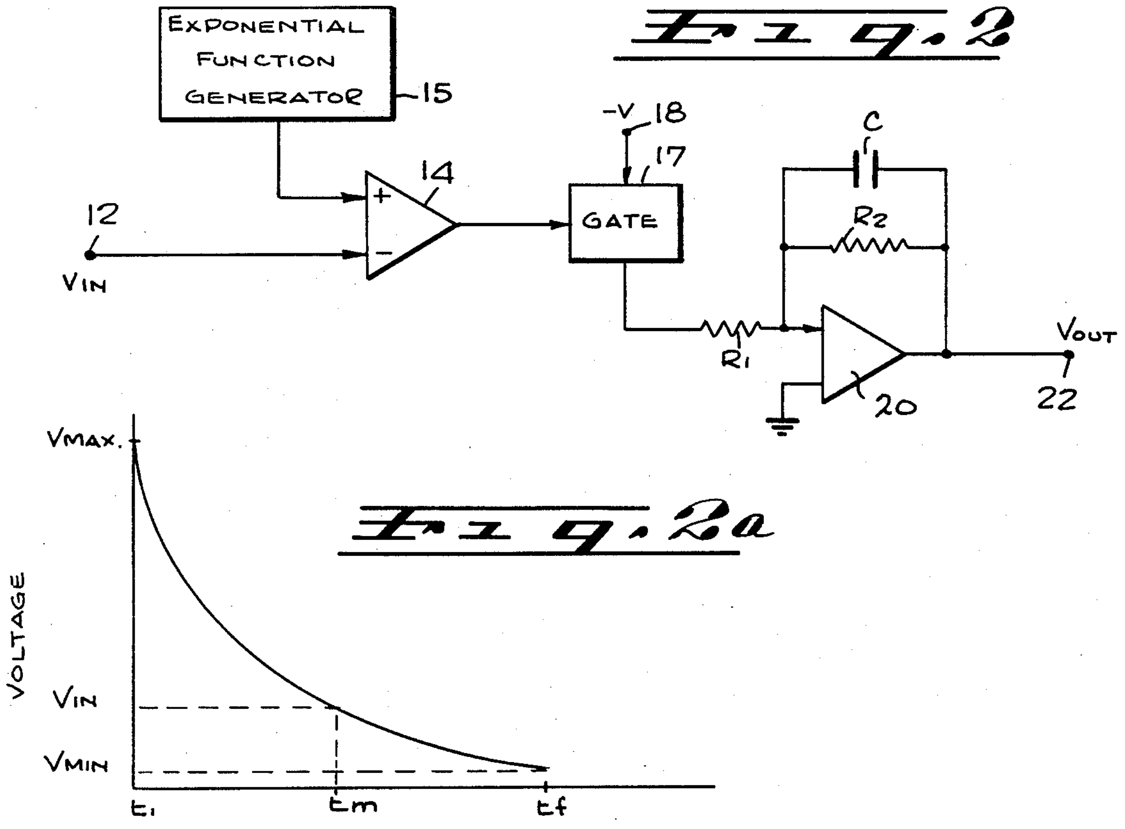
FIG. 2 is a diagram of one embodiment of an invention.
FIGS. 2*a* and 2*b* are diagrams of an exponential voltage employed in the embodiments of the present invention.
Figure 2B:
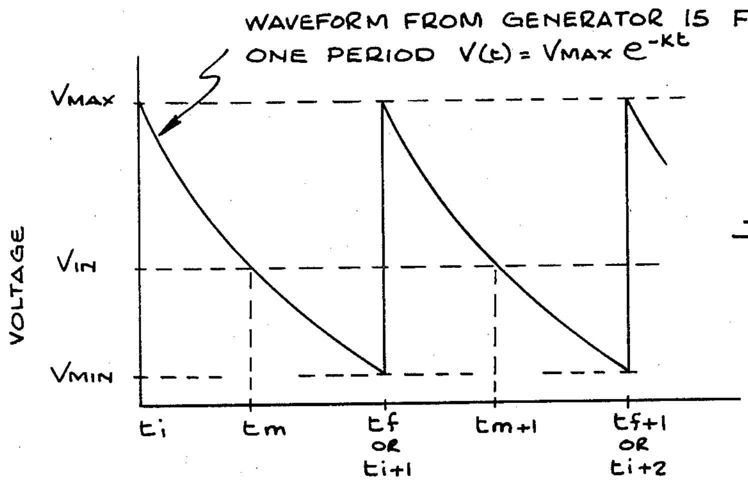

Attention is now directed to FIG. 2 which is a simple diagram of an embodiment designed to provide an output voltage which is a function of the log of an input voltage. Therein an input voltage $V_{in}$ is assumed to be applied to input terminal 12 which is connected to a comparator 14. An exponential function generator 15 is also connected to comparator 14. The output of the comparator to a gate 17 is positive as long as the voltage amplitude from generator 15 is greater than the amplitude of $V_{in}$. Otherwise the comparator's output is negative. The gate 17, which is assumed to be enabled by a negative output from comparator 14, is connected at terminal 18 to a source of constant voltage, designated —V, and to an operational amplifier 20 through a resistor $R_1$. The gate, when enabled, applies the voltage —V to the amplifier 20, whose output is connected to an output terminal 22. A feedback resistor $R_2$ interconnects the amplifier's output and input terminals. An integrating capacitor C is connected in parallel across $R_2$.

The generator 15 is assumed to provide an exponential voltage as shown in FIG. 2*a*. The voltage amplitude is assumed to be $V_{max}$ at time $t_i$ and $V_{min}$ at time $t_f$. At time $t_m$ the voltage amplitude from generator 15 is assumed to equal $V_{in}$.

In this circuit, without the feedback capacitor C, since gate 17 is only enabled during the period $t_f - t_m$, i.e., when the output of the comparator is negative, the output of amplifier at terminal 22, designated $V_{out}$, is $+(R_2/R_1)$ V during $t_f - t_m$ and zero during $t_m - t_i$. During the latter period the gate 17 is disabled since the voltage amplitude from generator 15 is greater than $V_{in}$ and therefore the output of the comparator is positive. Consequently, —V is not applied to the amplifier. However, by including capacitor C it integrates the output so that it represents the average value for the whole period from $t_i$ through $t_f$. That is:

$$V_{out} = (R_2/R_1) V [(t_f - t_m)/(t_f - t_i)] \quad (9)$$

From Equation 8 it should be apparent that $t_f - t_m$ and $t_f - t_i$ can be expressed as follows:

$$t_f - t_m = 1/k [\ln (V_{max}/V_{min}) - \ln (V_{max}/V_{in})] \quad (10)$$

$$t_f - t_i = 1/k [\ln (V_{max}/V_{min}) - \ln (V_{max}/V_{max})] \quad (11)$$

Therefore Equation 9 can be rewritten as $$V_{out} = \frac{R_2}{R_1} V \cdot \left[ \frac{\ln \frac{V_{in}}{V_{min}}}{\ln \frac{V_{max}}{V_{min}}} \right] \quad (12)$$

Clearly since $R_1$, $R_2$, V, $V_{max}$ and $V_{min}$ are all circuit constants, the output at terminal can be expressed as:

$$V_{out} = k_1 \log (k_2 V_{in}) \quad (13)$$

It is thus seen that the output voltage of the circuit shown in FIG. 2 is a function of the log of the input voltage $V_{in}$.

In the foregoing example, it was assumed that gate 17 is activated only when the output of the comparator 14 is negative. If however, gate 17 is designed to be activated only by a positive output of comparator 14, in the present example it will be enabled during $t_m - t_i$, during which —V will be applied to amplifier 20. Consequently, the output voltage $V_{out}$ can be expressed as:

$$V_{out} = (R_2/R_1) V \cdot [(t_m - t_i)/(t_f - t_i)] \quad (14)$$

Based on Equation 8, Equation 9 can be rewritten as:

$$V_{out} = \frac{R_2}{R_1} V \cdot \left[ \frac{\ln \frac{V_{min}}{V_{in}}}{\ln \frac{V_{min}}{V_{max}}} \right] \quad (15)$$

Thus, $$V_{out} = k_1 \ln (V_{max}/V_{in}) \quad (16)$$

It should be pointed out that if the input voltage $V_{in}$ does not change with time, a one shot measurement is sufficient. However, since most signals change with time, it is desirable to make repetitive measurements to follow the changing signal. Therefore preferably the generator 15 is assumed to provide a repetitive exponential voltage, as shown in FIG. *2b*. That is, the voltage amplitude changes repeatedly from $V_{max}$ to $V_{min}$ during each of a succession of time periods, each period being equal to $t_f - t_i$.

Figure 3:
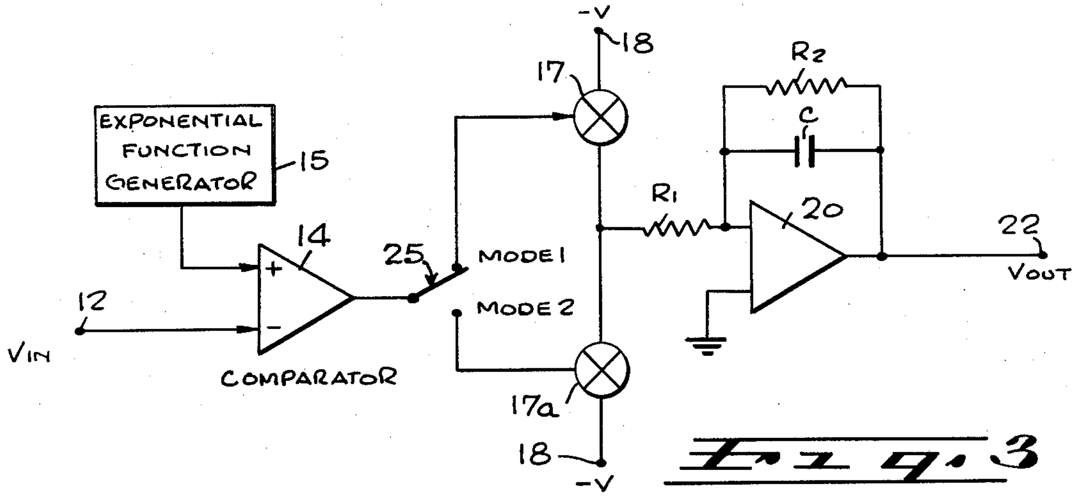
FIGS. 3 and 4 are diagrams of two additional embodiments of the invention.

It is thus seen that the output $V_{out}$ is a function of either the log of $V_{in}$ or the log of $1/V_{in}$ depending on whether the gate 17 is enabled by a negative or positive output of comparator 14. By providing a single pole double through switch 25 as shown in FIG. 3 and an additional gate 17*a* which is activated by a positive comparator output either output may be provided. In mode 1, $V_{out} \alpha \log V_{in}$ and in mode 2, $V_{out} \alpha \log 1/V_{in}$.

Figure 4:
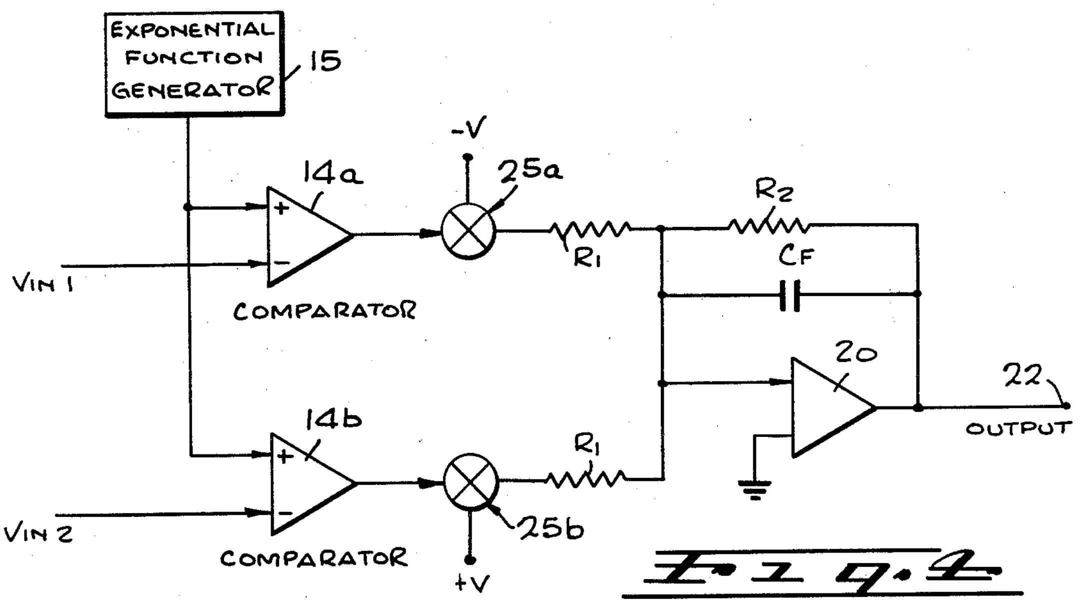
Figure 5:
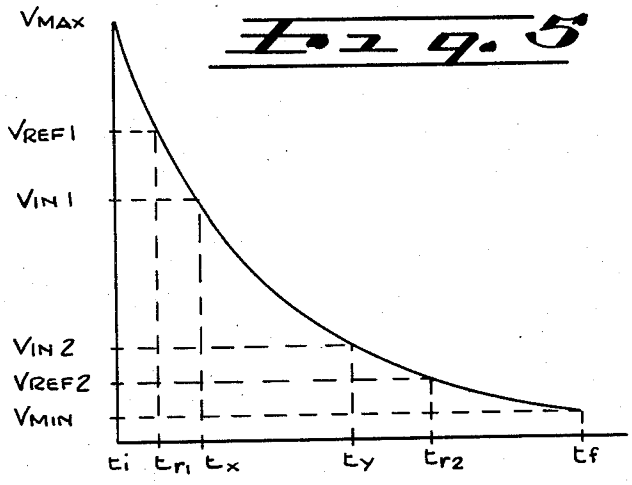
FIGS. 5 and 6 are diagrams useful in explaining the embodiments shown in FIG. 4.

Attention is now directed to FIG. 4 which is a diagram of an embodiment of a circuit designed to provide an output which is the function of the log of the ratio of two input voltages designated $V_{in1}$ and $V_{in2}$. The only requirement is that both input voltages lie between $V_{max}$ and $V_{min}$ as shown in FIG. 5. In FIG. 4, elements like those previously described are designated by like numerals. Therein $V_{in1}$ and $V_{in2}$ are applied to two separate comparators 14a and 14b which are also connected to generator 15. The positive output of comparator 14*a* activates a gate 25*a* which when enabled, supplies $-V$ through one resistor $R_1$ to amplifier 20. Similarly, the positive output of comparator 14*b* activates a gate 25*b*, which when enabled, supplies $+V$ through another resistor $R_1$ to the amplifier. Thus, $V_{in2}$ has a negative contribution at the output of terminal 22. Since both gates are enabled by positive comparator outputs, their mode of operation is analogous to that of mode 2 previously described.

From equation 16, it should be apparent that the contribution of $V_{in1}$ to the output of the amplifier 20 is $k_1 \ln (V_{max}/V_{in1})$, while that of $V_{in2}$ is $-k_1 \ln (V_{max}/V_{in2})$. The minus ($-$) sign is due to the fact that $+V$ rather than $-V$ is applied to the amplifier when gate 25*b* is enabled. Consequently, the output of amplifier 20 can be expressed as:

$$V_{out} = k_1 \ln (V_{max}/V_{in1}) - k_1 \ln (V_{max}/V_{in2}) \quad (17)$$

Therefore $$V_{out} = k_1 \ln (V_{in2}/V_{in1}) \quad (18)$$

It is thus seen that based on the novel method of log conversion of the present invention, the circuit shown in FIG. 4 provides an output which is a function of the log of the ratio of the two input voltages. In FIG. 4, it was assumed that both gates are enabled by positive control signals from the two comparators. It should be apparent that if desired one (or both) of the gates may be activated by a negative control signal by reversing the connection to the comparator which controls its operation.

The operation of the circuit shown in FIG. 4 may be looked at from a time domain point of view. In its operation, the amplitudes of the two input voltages are compared to the amplitude of the exponential voltage to define a time interval designated in FIG. 5 as $t_y - t_x$ during which the amplitude of only one of the input voltages exceeds the amplitude of the exponential voltage. It is this time interval that controls the output voltage.

Figure 6:
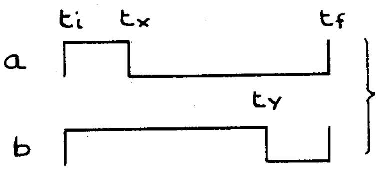

This aspect of the invention may be further explained in connection with FIG. 6. Therein lines a and b represent the outputs of the two comparators. It is clear that for the connections as shown in FIG. 4, the output of comparator 14*a* is positive during $t_x - t_i$ and negative during $t_f - t_x$. Also, the output of comparator 14*b* is positive during $t_y - t_i$ and negative during $t_f - t_y$. During the period $t_x - t_i$ both gates are enabled. However, since the gates apply voltages $-V$ and $+V$ which are of opposite polarities, the input to the amplifier is zero. It is only during $t_y - t_x$ that only gate 25*b* is enabled. Thus, it is during this period that $+V$ is applied to the amplifier. Consequently, its output has a negative sign or polarity. This is apparent since $V_{in2} < V_{in1}$ and therefore $(V_{in2}/V_{in1}) < 1$ and the log of this term is negative. If, however, $V_{in2}$ is greater than $V_{in1}$ during the time interval when the amplitude of only one of the input signals is greater than the amplitude of the exponential voltage only $-V$ is applied to the amplifier. Thus, the output is positive.

This aspect of the invention may further be appreciated from equation 8. Therefrom it is apparent that the time interval between two amplitudes of the exponential voltage is a function of the log of the ratio of the two amplitudes. In the particular equation $$t_3 - t_2 = 1/k \ln (A_2/A_3).$$

Clearly if two input voltages such as $V_{in1}$ and $V_{in2}$ are compared with the exponential voltage and they are respectively equal to its amplitude at times $t_x$ and $t_y$, as shown in FIG. 5, then, $$t_y - t_x = 1/k \ln (V_{in1}/V_{in2})$$

The absolute value of $\ln (V_{in1}/V_{in2})$ can be determined independent of $k$ by establishing a reference time interval which is proportional to the log of the ratio of two reference amplitudes. The length of the unknown time interval generated from the input signal can be compared to the reference time interval. Then the ratio of the two time intervals multiplied by the number of log units in the reference time interval gives a direct indication of the number of log units in the unknown interval independent of $k$.

For example, defining the reference time interval as $t_f - t_i$ it is apparent that $$t_f - t_i = 1/k \ln (V_{max}/V_{min})$$

Therefore, $$\frac{t_y - t_x}{t_f - t_i} = \frac{\frac{1}{k} \ln \frac{V_{in1}}{V_{in2}}}{\frac{1}{k} \ln \frac{V_{max}}{V_{min}}}$$

or $$(t_y - t_x) \left[ \frac{\ln \frac{V_{max}}{V_{min}}}{t_f - t_i} \right] = \ln \frac{V_{in1}}{V_{in2}}$$

Clearly, since $V_{max}$, $V_{min}$ and $t_f - t_i$ are constants, the term in the brackets is a constant. Consequently, by measuring $t_y - t_x$, the value of ln $(V_{in1}/V_{in2})$ can be determined very precisely. If $V_{max}$ is made to be equal to 10 times $V_{min}$, then using log to the base 10, the above expression can be rewritten as $$[(t_y - t_x)/(t_f - t_i)] = \ln_{10} (V_{in1}/V_{in2})$$

Both intervals $t_y - t_x$ and $t_f - t_i$ can be measured very precisely by means of two pulse-counting counters which start counting the pulses at times $t_x$ and $t_i$ and stop at times $t_y$ and $t_f$. Thus, the counts in the counters would represent $t_y - t_x$ and $t_f - t_i$.

Clearly other than $V_{max}$ and $V_{min}$ of the exponential voltage can be chosen to define a reference time interval. For example, two reference voltages designated in FIG. 5, $V_{ref1}$ and $V_{ref2}$ may be chosen to define a reference time interval $t_{r2} - t_{r1}$. In such an arrangement $$\frac{t_y - t_x}{t_{r2} - t_{r1}} = \frac{\ln = \dfrac{V_{in1}}{V_{in2}}}{\ln \dfrac{V_{ref1}}{V_{ref2}}}$$

Thus, by measuring $t_y - t_x$, $t_{r2} - t_{r1}$ since ln $(V_{ref1}/V_{ref2})$ is a constant, ln $(V_{in1}/V_{in2})$ may be determined to a high degree of precision.

Figure 7:
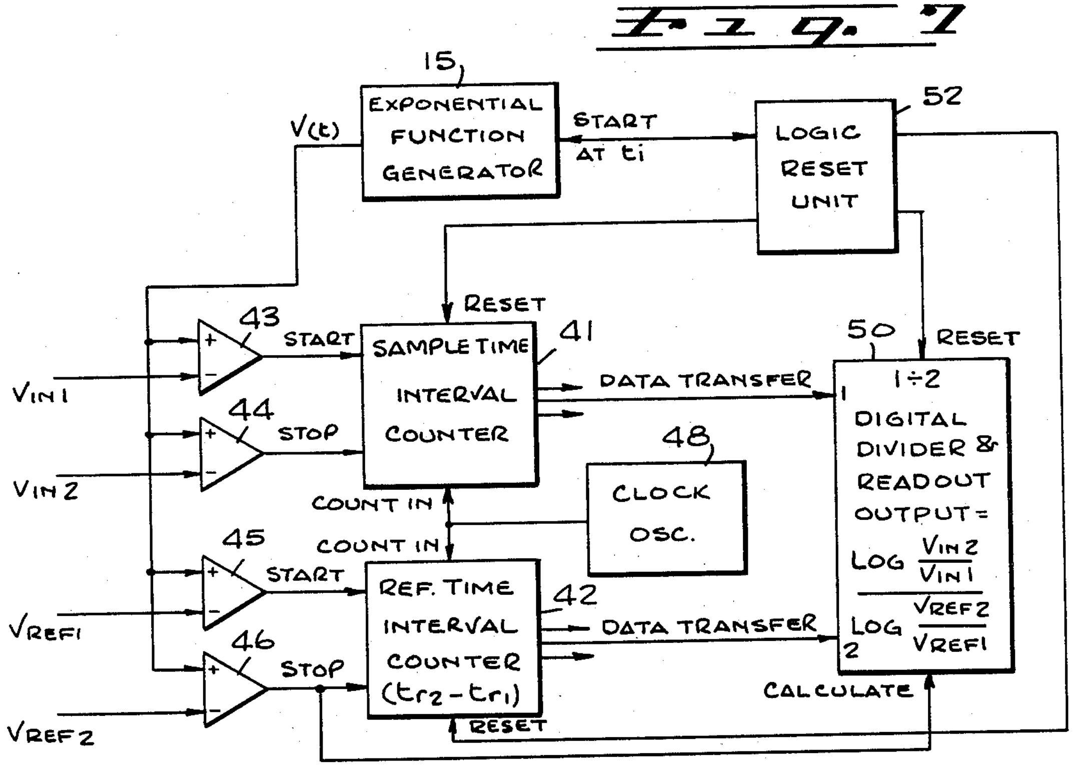
FIG. 7 is a diagram of yet another embodiment of the present invention.

An embodiment performing such a measurement is shown in FIG. 7 to which reference is now made. In this embodiment are included two counters 41 and 42, four comparators 43–46, a clock oscillator 48, a digital unit 50, the exponential function generator 15 and a logic reset unit 52. In operation at time $t_1$ when the exponential voltage amplitude is $V_{max}$ unit 52 is activated to reset counters 41 and 42 and unit 50. Clocking pulses are supplied to both counters by clock oscillator 48. However, neither counter counts them until it is enabled by a START signal. Counter 41 starts counting the pulses when enabled by comparator 43, which occurs when the exponential voltage amplitude equals $V_{in1}$. Similarly, counter 42 starts counting when enabled by comparator 45, which occurs when the exponential voltage amplitude equals $V_{ref1}$. Each counter keeps counting the clock pulses until a STOP signal is applied thereto. Counter 41 receives the STOP signal from comparator 44 when $V_{in2}$ equals the exponential voltage and counter 42 receives the STOP signal from comparator 46 when $V_{ref2}$ equals the exponential voltage.

It should thus be apparent that the count in counter 41 is directly related to $t_y - t_x$ and the count in counter 42 is directly related to $t_{r2} - t_{r1}$.

The STOP signal from comparator 46 also activates digital unit 50. The latter divides the count of counter 41 by the count in counter 42 and reads out a digital output which is equal to $$\frac{\ln = \dfrac{V_{in2}}{V_{in1}}}{\ln \dfrac{V_{ref2}}{V_{ref1}}}$$

Clearly, since ln $(V_{ref2}/V_{ref1})$ is a constant, the output of unit 50 is directly a function of ln $(V_{in2}/V_{in1})$. This embodiment is independent of all circuit parameters except the ratio of the reference voltages $V_{ref1}$ and $V_{ref2}$, the basic accuracy of the comparators and the exponential voltage.

Figure 8:
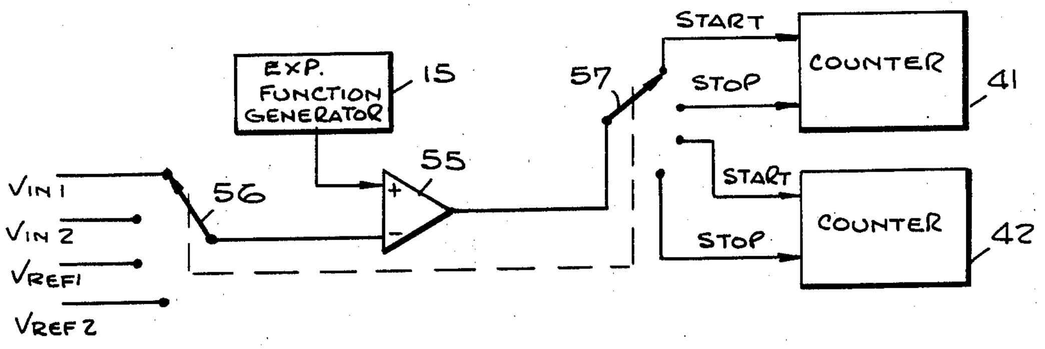
FIG. 8 is a partial diagram of an embodiment of the invention utilizing a single comparator.

The foregoing described embodiments are examples of only a few circuits based on the novel method of logarithmic conversion. In this method advantage is taken of the time domain as an intermediate step in the conversion of an analog input signal (or signals) into an output signal (analog or digital) which represents the log of the input signal (or the log of the ratio of the input signals). Many modifications and equivalents may be made in the described embodiments without departing from the spirit of the invention. For example, errors due to drift and D.C. offset in the comparators may be eliminated in a circuit using only one comparator which samples all the input signals in a chopped or time multiplexed mode. A single multiplexed-demultiplexed arrangement for the circuit shown in FIG. 7 is diagrammed in FIG. 8. Therein a single comparator 55 with two ganged switches 56 and 57 are shown. The operation should be obvious to those familiar with the art. Briefly, $V_{in1}$, $V_{in2}$, $V_{ref1}$ and $V_{ref2}$ are successively monitored by switch 56 and supplied to comparator 55 to produce the START and STOP signals to the two counters 41 and 42. Clearly if the interval exponential function generator does not exhibit any drift or changes in its output, i.e., the interval $t_f - t_i$ is very precise it can be used as the reference interval and counter 42 could be eliminated.

Other modifications and equivalents may be made in the embodiments herebefore described without departing from the true spirit of the invention. Therefore all such changes are deemed to fall within the scope of the invention as defined in the appended claims.

What is claimed is:

1. A circuit for providing an output which is a function of the logarithm of the ratio of two input signals of independently variable amplitudes comprising:

generator means for providing an exponential signal whose amplitude varies as an exponential function of time, during each of a succession of time periods; and circuit means responsive to first and second input signals of independently variable amplitudes and to said exponential signal for providing an output which is a function of the logarithm of the ratio of said first and second input signals, said output being directly related to the time interval in each of said periods during which the amplitude of said first input signal is greater than the amplitude of said exponential function and the amplitude of said second input signal is less than the amplitude of said exponential signal, the amplitude of each of said input signals being substantially constant during each of said periods.

2. A circuit for providing an output which is a function of the logarithm of the ratio of two input signals comprising:

generator means for providing an exponential signal whose amplitude varies as an exponential function of time, during each of a succession of time periods; and circuit means responsive to first and second input signals and to said exponential signal for providing an output which is a function of the logarithm of the ratio of said first and second input signals, said output being directly related to the time interval in each of said periods during which the amplitude of said first input signal is greater than the amplitude of said exponential function and the amplitude of said second input signal is less than the amplitude of said exponential signal, said circuit means include comparing means for providing during each of said time periods a first control signal of a first polarity during a first portion of each period when the amplitude of said first input signal is less than the amplitude of said exponential signal, said first control signal being of a second polarity during a second portion of each period when the amplitude of said exponential signal is less than the amplitude of said first input signal, said comparing means further providing a second control signal of a third polarity during a portion of each period when the amplitude of said second input signal is less than the amplitude of said exponential signal, said second control signal being of a fourth polarity during the portion of each period when the amplitude of said exponential signal is less than the amplitude of said second input signal, said time interval being defined by the interval during which said first control signal is of said second polarity and said second control signal is of said third polarity.

3. A circuit as described in claim 2 wherein said first and third polarities are the same, and said second and fourth polarities are the same.

4. A circuit as described in claim 2 wherein said circuit means further include amplifying means for amplifying first and second constant-amplitude signals suppliable thereto, and first and second gating means, said first gating means being responsive to said first control signal for enabling the supply of said first constant-amplitude signal to said amplifying means when said first control signal is of a selected one of said first and second polarities, and said second gating means being responsive to said second control signal for enabling the supply of said second constant-amplitude signal to said amplifying means when said second control signal is of a selected one of said third and fourth polarities.

5. A circuit as described in claim 4 wherein said first and second constant-amplitude signals are signals of opposite polarities and of equal amplitudes.

6. A circuit as described in claim 1 wherein said circuit means includes a source of clock pulses, and a first counter for counting said pulses only during said time interval.

7. A circuit as described in claim 6 wherein said circuit means includes comparing means for providing a first control signal to said first counter to start counting said clock pulses when the amplitude of said exponential signal equals the amplitude of one of said input signals and a second control signal to cause said first counter to stop counting said clock pulses when the amplitude of said exponential signal equals the amplitude of the other of said input signals.

8. A circuit as described in claim 7 wherein said circuit means further includes a second counter to which said clock pulses are applied, a source of two reference signals of different amplitudes and means for controlling said second counter to count said clock pulses only during an interval when the amplitude of only one of said reference signals is greater than the amplitude of said exponential signal.

9. A circuit comprising:

generator means for generating an exponential signal whose amplitude varies as an exponential function of time during each of a succession of equal time periods;

comparing means responsive to said exponential signal and to an input signal for providing a control signal of a first level when the amplitude of said exponential signal exceeds the input signal amplitude, and of a second level when the amplitude of said exponential signal is not greater than the input signal amplitude; and circuit means responsive to said control signal for providing an output signal which is a function of either the logarithm of said input signal or the logarithm of a ratio of a selected constant divided by said input signal, said circuit means including a source of a constant-amplitude signal, amplifying and integrating means for amplifying and integrating the constant-amplitude signal applied thereto, to provide an output whose amplitude is a function of at least said time period and the portion of said time period during which said constant-amplitude signal is applied, said circuit means further including a first gate which is enabled when said control signal is of said first level for applying said constant-amplitude signal to said amplifying and integrating means, and a second gate which is enabled when said control signal is of said second level for applying said constant-amplitude signal to said amplifying and integrating means, and switchable means coupled to said comparing means and to said first and second gates for selectively applying said control signal to either said first gate or to said second gate.

10. A circuit comprising:

generator means for generating an exponential signal whose amplitude varies as an exponential function of time during each of a succession of equal time periods;

a comparator responsive to said exponential signal and to an input signal for providing a control signal of a first level during a first time portion of each of said time periods when the exponential signal amplitude exceeds the input signal amplitude, said control signal being of a second level during a second time portion of each time period when the exponential signal amplitude is not greater than the input signal amplitude;

a first constant-amplitude signal;

a second constant-amplitude signal;

a junction point;

a first gate coupled to said first constant-amplitude signal and to said junction point, and being enabled by a selected one of the levels of said control signal for applying, when enabled, said first constant-amplitude signal to said junction point;

a second gate coupled to said second constant-amplitude signal and to said junction point and being enabled by a selected one of the levels of said control signal for applying, when enabled, said second constant-amplitude signal to said junction point;

switch means for selectively applying said control signal either to said first gate or to said second gate; and amplifying and integrating means connected to said junction point for amplifying the signal thereat to provide an output whose amplitude is a function of at least said time period and the time portion during which either said first or said second constant-amplitude signal is applied to said junction point.

11. The circuit as described in claim 10 wherein said first and second constant-amplitude signals are of the same amplitude.

12. The circuit as described in claim 10 wherein said first and second constant-amplitude signals are of the same polarity and said first gate is enabled by said control signal of said first level and said second gate is enabled by said control signal of said second level.

13. The circuit as described in claim 12 wherein said first and second constant-amplitude signals are of the same amplitude.

14. A circuit for providing an output signal which is a function of the logarithm of the ratio of the amplitudes of first and second input signals comprising:

generator means for providing an exponential signal whose amplitude varies as an exponential function of time from a first level to a second level in a selected time period;

comparing means responsive to a first input signal of variable amplitude and to a second input signal of a variable amplitude, the amplitude of said second input signal being not greater than the amplitude of the first input signal, said comparing means being further responsive to said exponential signal, for providing a first control signal when the amplitude of said first input signal equals the amplitude of said exponential signal, and for providing a second control signal when the amplitude of said second input signal equals the amplitude of said exponential signal, the amplitude of each input signal being substantially constant during said selected time period;

a source of pulses;

first counter means coupled to said source of pulses and responsive to said first and second control signals for starting to count pulses from said source when the first control signal is provided and for terminating the count of said pulses when the second control signal is provided; and circuit means responsive to the count in said first counter means for providing an output signal which is a function of the logarithm of the ratio of the amplitudes of the first and second input signals during said time period.

15. The circuit as described in claim 14 wherein the amplitude of said first input signal is less than the first level of said exponential signal and the amplitude of said second input signal is greater than the second level of said exponential signal, said circuit further including:

a source of a first reference signal of an amplitude which is smaller than the first level of said exponential signal and not less than the amplitude of said first input signal;

a source of a second reference signal of an amplitude which is greater than the amplitude of the second level of said exponential signal and not greater than the amplitude of the second input signal;

said comparing means being further responsive to said first and second reference signals for providing third and fourth control signals when the respective amplitudes of said first and second reference signals equal the amplitude of said exponential signal; and second counting means responsive to said third and fourth control signals for starting to count the pulses from said source when the third control signal is produced and for terminating the count when the fourth control signal is produced, said circuit means being responsive to the counts in said first and second counting means for providing said output signal.

* * * * *